United States Patent
Stanhope et al.

(10) Patent No.: US 12,433,187 B2
(45) Date of Patent: Oct. 7, 2025

(54) SYSTEMS AND METHODS FOR MONITORING SEED PLACEMENT WITHIN THE GROUND

(71) Applicant: CNH Industrial Canada, Ltd., Saskatoon (CA)

(72) Inventors: Trevor Stanhope, Oak Lawn, IL (US); Jamil Farhat, Spicer, MN (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 835 days.

(21) Appl. No.: 17/699,912

(22) Filed: Mar. 21, 2022

(65) Prior Publication Data

US 2023/0292650 A1  Sep. 21, 2023

(51) Int. Cl.
- *A01C 7/10* (2006.01)
- *A01C 5/06* (2006.01)
- *G01S 13/88* (2006.01)

(52) U.S. Cl.
CPC ............ *A01C 7/105* (2013.01); *G01S 13/885* (2013.01); *A01C 5/064* (2013.01); *A01C 5/068* (2013.01)

(58) Field of Classification Search
CPC ........... A01C 7/105; A01C 7/102; A01C 7/10; A01C 7/08; A01C 7/00; A01C 5/064; A01C 5/062; A01C 5/06; A01C 5/00; A01C 5/068; A01C 5/066; G01S 13/885; G01S 13/88; G01S 13/00
See application file for complete search history.

(56) References Cited

U.S. PATENT DOCUMENTS

| | | | |
|---|---|---|---|
| 8,849,523 | B1 | 9/2014 | Chan et al. |
| 9,924,629 | B2 | 3/2018 | Batcheller et al. |
| 10,912,251 | B2 | 2/2021 | Pickett et al. |
| 2018/0128914 | A1 | 5/2018 | Veronese et al. |
| 2020/0107492 | A1* | 4/2020 | Antich .................. A01B 49/06 |
| 2020/0359550 | A1 | 11/2020 | Tran et al. |

OTHER PUBLICATIONS

Kenneth Mapoka, "Nondestructive measurement system to determine corn seed planting depth using ground penetrating radar for precision agriculture", Iowa State University, Graduate Theses and Dissertations, Ames, Iowa, 2018, (192 pages) https://lib.dr.iastate.edu/cqi/viewcontent.cqi?article=7854&context=etd.

* cited by examiner

*Primary Examiner* — Christopher J. Novosad
(74) *Attorney, Agent, or Firm* — Dority & Manning, P.A.

(57) ABSTRACT

A system for monitoring seed placement within the ground during the performance of a planting operation includes a row unit including a furrow opening assembly configured to create a furrow in the soil and a furrow closing assembly configured to close the furrow after the seeds have been deposited therein. Particularly, the seeds are coated seeds that are coated with a coating having a coating dielectric property that is greater than a dielectric property of the seeds without the coating. The system further includes a seed placement sensor supported relative to the row unit and configured to generate data indicative of the coated seeds as planted underneath a surface of the soil. Additionally, the system includes a computing system configured to determine a seed placement parameter associated with the coated seeds underneath the surface of the soil based at least in part on the data generated by the seed placement sensor.

19 Claims, 4 Drawing Sheets

SYSTEMS AND METHODS FOR MONITORING SEED PLACEMENT WITHIN THE GROUND

FIELD OF THE INVENTION

The present disclosure relates generally to planting operations performed using a planting implement, such as a planter or a seeder, and, more particularly, to systems and methods for monitoring seed placement within the ground during the performance of a planting operation.

BACKGROUND OF THE INVENTION

Planting implements, such as planters, are generally known for performing planting operations within a field. A typical planter includes a plurality of row units, with each row unit including various ground engaging tools for creating a furrow within the soil, placing a seed within the furrow, and closing the soil around the seed. Typically, to monitor the operation of a given row unit, a sensor will often be provided with unit's seed tube for detecting seeds as they pass through the tube before being deposited within the furrow. Such sensor data is then used to estimate certain seed-related parameters, such as the seeding rate. However, since the seed tube sensor is detecting the seeds prior to their deposition within the soil, the associated sensor data cannot be used to accurately estimate parameters related to the placement of seeds within the soil, such as the seed depth or spacing between seeds, particularly since the seeds may bounce, roll, or otherwise land off-target as they are dropped from the seed tube into the furrow. Seeds may also be displaced during the furrow closing process, which cannot be detected using the seed tube sensor.

Accordingly, an improved system and method for monitoring seed placement within the ground during the performance of a planting operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring seed placement within the ground during the performance of a planting operation. The system may include a row unit configured to deposit seeds within soil, the row unit including a furrow opening assembly configured to create a furrow in the soil for depositing seeds and a furrow closing assembly configured to close the furrow after the seeds have been deposited therein. The seeds are coated seeds that are coated with a coating having a coating dielectric property that is greater than a dielectric property of the seeds without the coating. The system may further include a seed placement sensor supported relative to the row unit and being configured to generate data indicative of the coated seeds as planted underneath a surface of the soil. Additionally, the system may include a computing system communicatively coupled to the seed placement sensor. The computing system is configured to receive the data generated by the seed placement sensor, and determine a seed placement parameter associated with the coated seeds underneath the surface of the soil based at least in part on the data generated by the seed placement sensor.

In another aspect, the present subject matter is directed to a method for monitoring seed placement within the ground during the performance of a planting operation by a row unit configured to deposit seeds within soil, where the row unit includes a furrow opening assembly configured to create a furrow in the soil for depositing seeds and a furrow closing assembly configured to close the furrow after the seeds have been deposited therein. The method may include receiving, with a computing device, data generated by a seed placement sensor supported relative to the row unit, the data being indicative of the seeds as planted underneath a surface of the soil, where the seeds are coated seeds that are coated with a coating having a coating dielectric property that is greater than a dielectric property of the seeds without the coating. The method may further include determining, with the computing device, a seed placement parameter associated with the coated seeds underneath the surface of the soil based at least in part on the data generated by the seed placement sensor. Additionally, the method may include performing, with the computing device, a control action associated with the row unit based at least in part on the seed placement parameter.

In a further aspect, the present subject matter is directed to a system for monitoring seed placement within the ground during the performance of a planting operation with a planting implement. The system includes a row unit of the planting implement configured to deposit seeds within soil. The row unit has a furrow opening assembly configured to create a furrow in the soil for depositing the seeds and a furrow closing assembly configured to close the furrow after the seeds have been deposited therein. Each seed is treated with a treatment applied after the seed is received within a component of the planting implement and before the furrow is closed, where the treatment has a treatment dielectric property that is greater than a dielectric property of the seeds without the treatment. The system further includes a seed placement sensor is supported relative to the row unit and is configured to detect the seeds as treated and planted underneath a surface of the soil. Additionally, the system includes a computing system communicatively coupled to the seed placement sensor. The computing system is configured to receive data generated by the seed placement sensor, and to determine a seed placement parameter associated with the seeds as treated and planted underneath the surface of the soil based at least in part on the data generated by the seed placement sensor.

In an additional aspect, the present subject matter is directed to a method for monitoring seed placement within the ground during the performance of a planting operation by a row unit of a planting implement, where the row unit is configured to deposit seeds within soil. The row unit includes a furrow opening assembly configured to create a furrow in the soil for depositing seeds and a furrow closing assembly configured to close the furrow after the seeds have been deposited therein. The method includes treating each seed with a treatment after the seed is received within a component of the planting implement and before the furrow is closed around the seed. The treatment has a treatment dielectric property that is greater than a dielectric property of the seeds without the treatment. The method further includes receiving, with a computing device, data generated by a seed placement sensor supported relative to the row unit, the data being indicative of the seeds as treated and planted underneath a surface of the soil. Additionally, the method includes determining, with the computing device, a seed placement parameter associated with the seeds as treated and planted underneath the surface of the soil based at least in part on the data generated by the seed placement sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring seed placement within the ground during the performance of a planting operation. Specifically, in several embodiments, a planting implement may include a plurality of row units, with each row unit including various ground engaging tools for creating a furrow within the soil, placing a seed within the furrow, and closing the furrow around the seed. Additionally, one or more of the row units may also include or be associated with a seed placement sensor configured to detect seeds within the ground. For instance, the seed placement sensor may correspond to a non-contact sensor configured to detect seeds located underneath the soil (e.g., post-closing of the furrow), such as a ground-penetrating radar.

In accordance with aspects of the present subject matter, the seeds planted using the planting implement are either treated by the planting implement with a treatment before the furrow is closed or are coated seeds (e.g., seeds coated with a coating before being loaded into the planting implement), where a dielectric property (i.e., a permittivity and/or conductivity) of the treatment/coating is greater than the dielectric property of the seeds without the treatment or coating. Particularly, when ground has a higher moisture and/or clay contents, the ground causes higher attenuation of the seed placement sensor waves, which means that a seed placement sensor cannot penetrate the ground as deeply. As such, by applying a treatment and/or coating with an improved dielectric property, particularly a higher permittivity and/or conductivity, the seed placement sensor is better able to detect the treated or coated seeds, even when the ground has a higher moisture and/or clay content. The data generated by the seed placement sensor may then be communicated to a computing system configured to determine and/or monitor one or more seed-related placement parameters based on the sensor data, such as the seed depth, seed position within a trench, and/or the like, as well as one or more other seed placement parameters, such as relative seed spacing, seed population, and/or the like.

Figure 1:
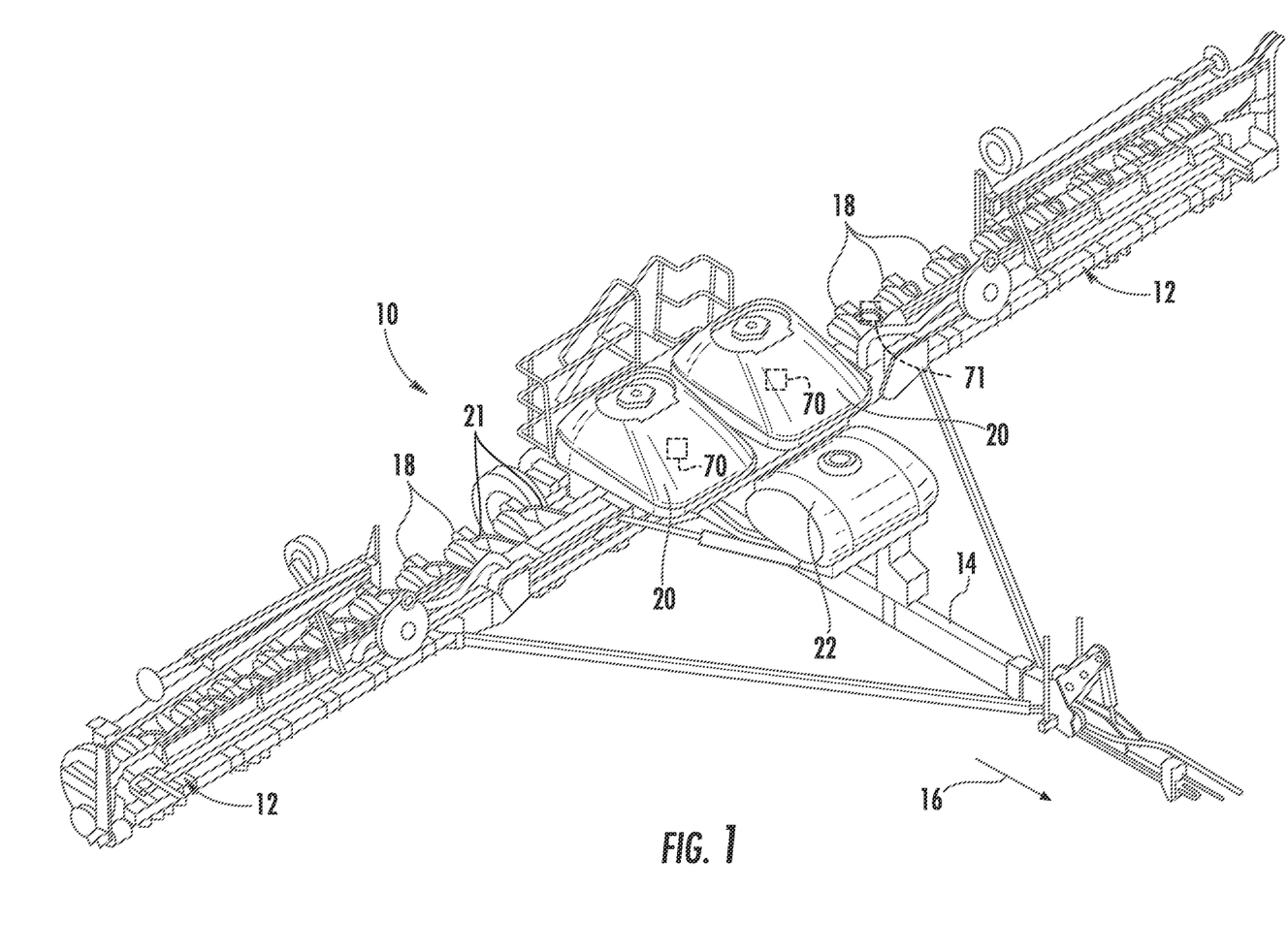
FIG. 1 illustrates a perspective view of one embodiment of a planting implement in accordance with aspects of the present subject matter.

Referring now to drawings, FIG. 1 illustrates a perspective view of one embodiment of a planting implement (e.g., a planter 10) in accordance with aspects of the present subject matter. As shown in FIG. 1, the planter 10 may include a laterally extending toolbar or frame assembly 12 connected at its middle to a forwardly extending tow bar 14 to allow the planter 10 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18 via one or more delivery lines 21. Additionally, one or more fluid tanks 22 may store agricultural fluids, such as insecticides, herbicides, fungicides, fertilizers, and/or the like.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 may be selected based on the type of crop being planted. For example, the row units 18 may be spaced approximately 30 inches from one another for planting corn, and approximately 15 inches from one another for planting soybeans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration or any other planting implement configuration, including seeders.

Figure 2:
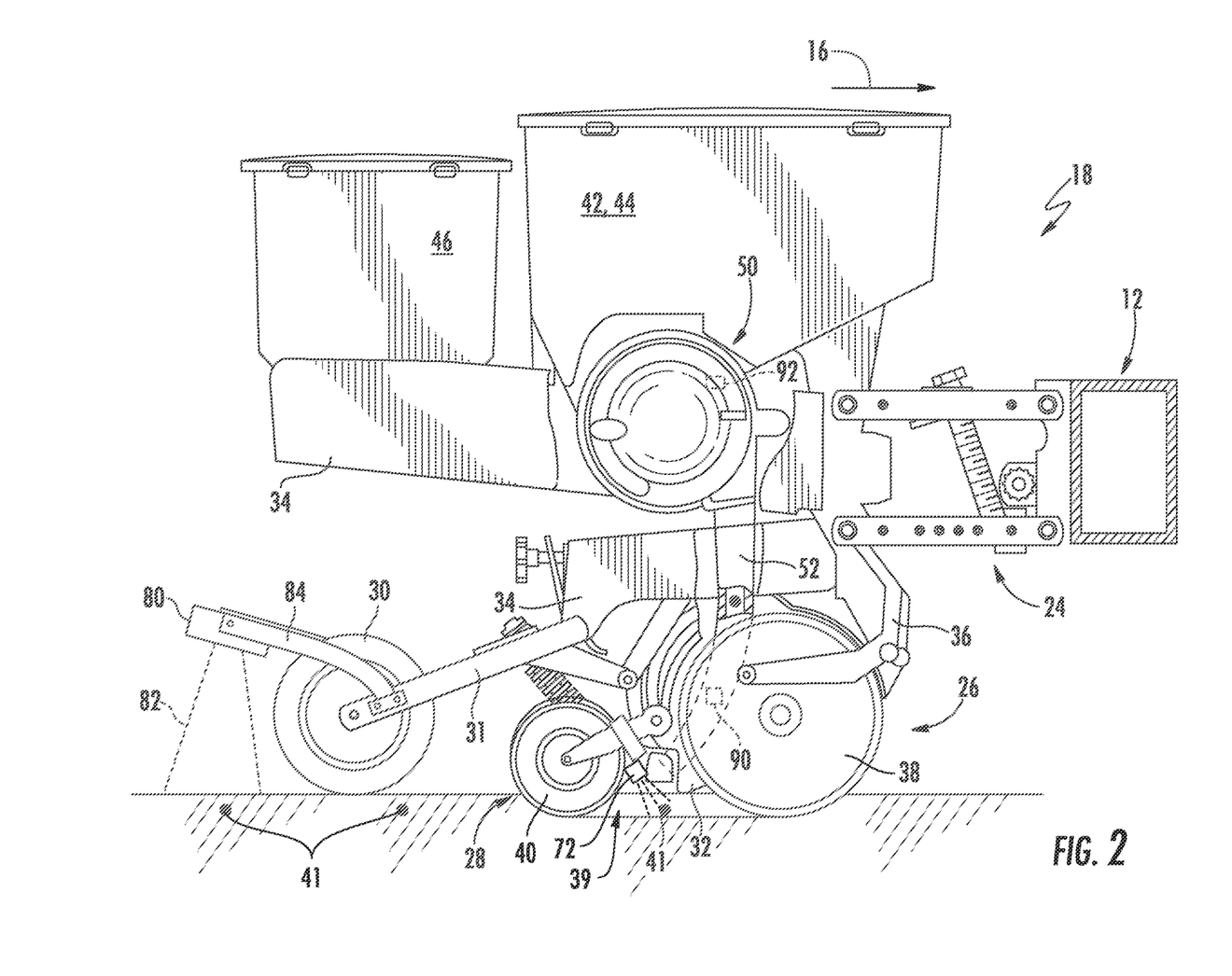
FIG. 2 illustrates a side view of one embodiment of a row unit suitable for use with a planting implement in accordance with aspects of the present subject matter.

Referring now to FIG. 2, a side view of one embodiment of a row unit 18 is illustrated in accordance with aspects of the present subject matter. As shown, the row unit 18 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel 30. In general, the furrow opening assembly 26 may include a gauge wheel (not shown) operatively connected to a frame 34 of the row unit 18 via a support arm 36. Additionally, the opening assembly 26 may also include one or more opening disks 38 configured to excavate a trench or furrow 39 in the soil, and a firming point 32. The gauge wheel is not shown to better illustrate the opening disk 38. As is generally understood, the gauge wheel may be configured to engage the surface of the field, with the height of the opening disk(s) 38 being adjusted with respect to the position of the gauge wheel to set the desired depth of the furrow 39 being excavated. Moreover, as shown, the furrow closing assembly 28 may include a closing disk(s) 40 configured to close the furrow 39 after seeds 41 have been deposited therein. The press wheel 30 may then be configured to roll over the closed furrow 39 to firm the soil over the seed 41 and promote favorable seed-to-soil contact.

Additionally, as shown in FIG. 2, the row unit 18 may include one or more seed hoppers 42, 44 and a fluid tank 46 supported on the frame 34. In general, the seed hopper(s) 42, 44 may be configured to store seeds 41 received from the seed tanks 20, which are to be deposited within the furrow 39 as the row unit 18 moves over and across the field. For instance, in several embodiments, the row unit 18 may include a first seed hopper 42 configured to store seeds of a first seed type and a second hopper 44 configured to store seeds of a second seed type. However, both seed hoppers 42, 44 may be configured to store the same type of seeds. Furthermore, the fluid tank 46 may be configured to store fluid received from the fluid tank 22 (FIG. 1), which is to be sprayed onto the seeds dispensed from the seed hoppers 42, 44 or while the seeds are held within the seed hoppers 42, 44.

Moreover, the row unit 18 may include a seed meter 50 provided in operative association with the seed hopper(s) 42, 44. In general, the seed meter 50 may be configured to uniformly release seeds 41 received from the seed hopper(s) 42, 44 for deposit within the furrow 39. For instance, in one embodiment, the seed meter 50 may be coupled to a suitable vacuum source (e.g., a blower powered by a motor and associated tubing or hoses) configured to generate a vacuum or negative pressure that attaches the seeds to a rotating seed disk of the seed meter 50, which controls the rate at which the seeds 41 are output from the seed meter 50 to an associated seed tube 52. As shown in FIG. 2, the seed tube 52 may extend vertically from the seed meter 50 toward the ground to facilitate delivery of the seeds 41 output from the seed meter 50 to the furrow 39.

Referring still to FIG. 2, one or more seed placement sensors 80 may also be supported relative to each row unit 18. In general, the seed placement sensor(s) 80 may be configured to generate data indicative of the placement of the deposited seeds 41 within the soil, thereby allowing one or more related placement parameters to be determined for the associated planting operation (e.g., individual seed depth/position, relative seed spacing, seed population, missing seeds, etc.). In several embodiments, the seed placement sensor(s) 80 may be configured to detect seeds 41 located underneath the soil surface (e.g., post-closing of the furrow 39). In such embodiments, the seed placement sensor(s) 80 may generally be configured to be installed on or otherwise positioned relative to the row unit 18 such that the sensor(s) 80 has a field of view or detection zone 82 directed towards the soil surface at a location aft of the furrow closing assembly 28 (e.g., relative to the direction of travel 16 of the planter 10). For instance, as shown in FIG. 2, the seed placement sensor(s) 80 is supported relative to the row unit 18 (e.g., via a support arm 84 coupled to an associated support arm 31 of the press wheel 30) such that the sensor(s) 80 is configured to generate data associated with a portion of the field located immediately behind the aft-most ground-engaging tool of the row unit 18 (e.g., the press wheel 30). However, in other embodiments, the detection zone 82 of the sensor(s) 80 may be directed at any other suitable location that allows the sensor(s) 80 to detect seeds 41 positioned underneath the soil surface, such as at a location between the furrow closing assembly 28 and the press wheel 30.

In several embodiments, the seed placement sensor(s) 80 may correspond to a non-contact sensor configured to detect seeds 41 located underneath the soil surface. For instance, in one embodiment, the seed placement sensor(s) 80 may be a ground penetrating radar configured to detect seeds deposited underneath the soil surface. In such an embodiment, the seed placement sensor(s) 80 may, for example, include one or more pairs of transmitters and receivers, with the transmitter(s) being configured to transmit electromagnetic waves towards and through the soil and the receiver(s) being configured to detect the waves as reflected off sub-surface features (e.g., seeds). In other embodiments, the seed placement sensor(s) 80 may correspond to any other suitable non-contact sensor capable of detecting seeds deposited underneath the soil surface.

The waves generated by the seed placement sensor(s) 80 are reflected off the seeds due to the contrast between a dielectric property (e.g., the permittivity and/or conductivity) of the ground and a dielectric property of the seeds. Ground that is moist and/or has a high clay content generally has a higher permittivity and a higher conductivity than ground that is dry and/or sandy, and generally has a higher permittivity and a higher conductivity than seeds. While increased dielectric contrast between the ground and the seeds should show improved detectability of the seeds in moist and/or clay ground over drier and/or sandy ground, it is generally more difficult to identify where the seeds are located in moist and/or clay ground as the higher permittivity and the higher conductivity of the ground cause more attenuation of the waves generated by the seed placement sensor(s) 80. Higher attenuation means that the waves cannot penetrate as deeply for detecting the seeds. Thus, in accordance with aspects of the present subject matter, the seeds 41 dispensed by the row unit 18 may be coated with a coating (e.g., by a seed producer, by an operator of the planting implement 10, etc.) before being received by the planting implement 10 and/or may be treated with a treatment (e.g., by the planting implement 10) after being received by the planting implement 10 and before the furrow 39 is closed over the seeds 41 such that the coated and/or treated seeds have a dielectric property (e.g., the permittivity and/or conductivity) that is different than the seeds without the coating and/or treatment. By changing the effective dielectric property of the seeds 41, the interaction between the waves and the seeds 41 changes in a way that allows the seeds 41 may be more visible to the seed placement sensor(s) 80. It should be appreciated that a given coating or treatment may be used that only varies one of the effective dielectric properties of the seeds (e.g., permittivity or conductivity) or the coating or treatment may change both of such properties. However, when the coating or treatment varies both properties, the magnitude of the change will generally vary between permittivity and conductivity as such parameters are not directly correlated.

For instance, in several embodiments, the coating and/or the treatment has a permittivity that is greater than a permittivity of the seeds without the coating and/or the treatment. In one embodiment, the permittivity of the coating and/or the treatment is greater than the permittivity of the seeds without the coating and/or the treatment by a substantial percentage, such as at least 25% greater than the permittivity of the seeds without the treatment and/or coating, such as 50% greater than the permittivity of the seeds without the treatment and/or coating, such as 100% greater than the permittivity of the seeds without the treatment and/or coating, such as 200% greater than the permittivity of the seeds without the treatment and/or coating, such as 300% greater than the permittivity of the seeds without the treatment and/or coating, and/or the like. Similarly, in several embodiments, the coating and/or the treatment may have a conductivity that is greater than a conductivity of the seeds without the coating and/or the treatment. In one embodiment, the conductivity of the coating and/or the treatment is greater than the conductivity of the seeds without the coating and/or the treatment by a substantial percentage, such as at least 25% greater than the conductivity of the seeds without the treatment and/or coating, such as 50% greater than the conductivity of the seeds without the treatment and/or coating, such as 100% greater than the conductivity of the seeds without the treatment and/or coating, such as 200% greater than the conductivity of the seeds without the treatment and/or coating, such as 300% greater than the conductivity of the seeds without the treatment and/or coating, and/or the like. The coating and/or the treatment may comprise any suitable coating material and/or treatment material such that the dielectric property of the seeds 41 is improved for detection by the seed placement sensor(s) 80. For instance, the coating material and/or treatment material may comprise graphite, iron oxide (e.g., magnetite), and/or the like. For example, a seed without coating and treatment may have a dielectric permittivity of 3-5, while graphite has a dielectric permittivity of 18 and magnetite has a dielectric permittivity between 33-81. Similarly, a seed without coating and treatment may have an electrical conductivity of approximately 0 Siemens/centimeter [S/cm], while graphite has an electrical conductivity of approximately 10000 S/cm and magnetite has an electrical conductivity of approximately 100 S/cm.

In one embodiment, the treatment may be applied to the seeds 41 by the planting implement 10 at one or more of the seed tanks 20, the delivery line(s) 21, or the row units 18. For instance, the treatment may be added to the seed tanks 20 at the same time the seeds 41 are being added, before the seeds 41 are added, after the seeds 41 are added, and/or in any other suitable order. The treatment may be added to the seed tanks 20 via the port of the seed tanks 20 by a dispenser separate from the planting implement 10 and/or via a treatment dispenser 70 (FIG. 1) mounted to the tanks 20 and controllable by the planting implement 10. Alternatively, or additionally, the treatment may be introduced at the delivery lines 21 between the seed tanks 20 and the row units 18 by a treatment dispenser 71 (FIG. 1) coupled to the delivery lines 21 and controllable to meter the treatment into the delivery lines 21 during the seed delivery to the row units 18. Moreover, in some embodiments, the row units 18 may include a treatment sprayer 72 supported thereon and configured to spray or otherwise dispense the treatment onto the seeds 41 dispensed from the row units 18 as the seeds 41 are dispensed from the row units 18 or after the seeds 41 are deposited in the furrow 39. For example, as shown in FIG. 2, the treatment sprayer 72 may be mounted on the row unit 18 such that the treatment sprayer 72 is positioned to spray the treatment between the opening disk 38 and the closing disk 40 to reach the seeds 41. However, the treatment sprayer 72 may be configured to spray the treatment onto the seeds 41 while the seeds 41 are still in the seed tube 52 or before the seeds 41 reach the seed tube 52. In one embodiment, the treatment sprayer 72 may be fluidly coupled to one of the fluid tanks 22, 46, and the treatment may be added to the fluid tank(s) 22, 46. However, in another embodiment, the treatment sprayer 72 may have a tank separate of the fluid tanks 22, 46 and configured to hold the treatment. The treatment applicators 70, 71, 72 may comprise any suitable elements to provide the treatment at the various associated locations on the planting implement 10, such as a pump, a conduit, a treatment reservoir(s), a valve and/or the like.

Additionally, in several embodiments, the row unit 18 may also include one or more sensors 90, 92 for generating data indicative of the timing and/or frequency of seeds 41 being deposited into the furrow 39 between the opening and closing assemblies 26, 28. For instance, as shown in the illustrated embodiment, the row unit 18 may include one or more seed tube sensors 90 configured to detect seeds as they fall or otherwise travel through the seed tube 52. In such an embodiment, the seed tube sensor 90 may generally correspond to any suitable sensor or sensing device configured to detect seeds passing through the seed tube 52 (e.g., whether falling through the tube 52 via gravity or by being conveyed through the tube 52 via a driven belt or other seed-transport means extending within the seed tube 52). For example, the seed tube sensor 90 may correspond to an optical sensor (e.g., a break-beam sensor or a reflectance sensor), a microwave sensor, a Hall-effect sensor, and/or the like.

In addition to the seed tube sensor 90 (or as an alternative thereto), the row unit 18 may include other sensors for generating data indicative of the timing and frequency of seeds 41 being deposited into the furrow 39. For instance, as shown in the illustrated embodiment, the row unit 18 may include one or more seed meter sensors 92 configured to detect seeds 41 that are being or will be discharged from the seed meter 50. Specifically, in one embodiment, the seed meter sensor(s) 92 may correspond to a post-singulation sensor positioned within the seed meter 50 such that the sensor's detection zone is aligned with a location within a post-singulation region of the seed meter 50: (1) across which the seed disc or other seed transport member is rotated following the singulator (not shown) of the seed meter 50; and/or (2) through which each seed 41 to be discharged from seed meter 50 passes following release of the seed 41 from the seed disc. In such an embodiment, the seed meter sensor 92 may generally correspond to any suitable sensor or sensing device configured to detect seeds that are being or will be discharged from the seed meter 50. For example, the seed meter sensor 92 may correspond to an optical sensor (e.g., a break-beam sensor or a reflectance sensor), a microwave sensor, a Hall-effect sensor, and/or the like.

It should be appreciated that the configuration of the row unit 18 described above and shown in FIG. 2 is provided only to place the present subject matter in an exemplary field of use. Thus, it should be appreciated that the present subject matter may be readily adaptable to any manner of seed planting unit configuration.

Figure 3:
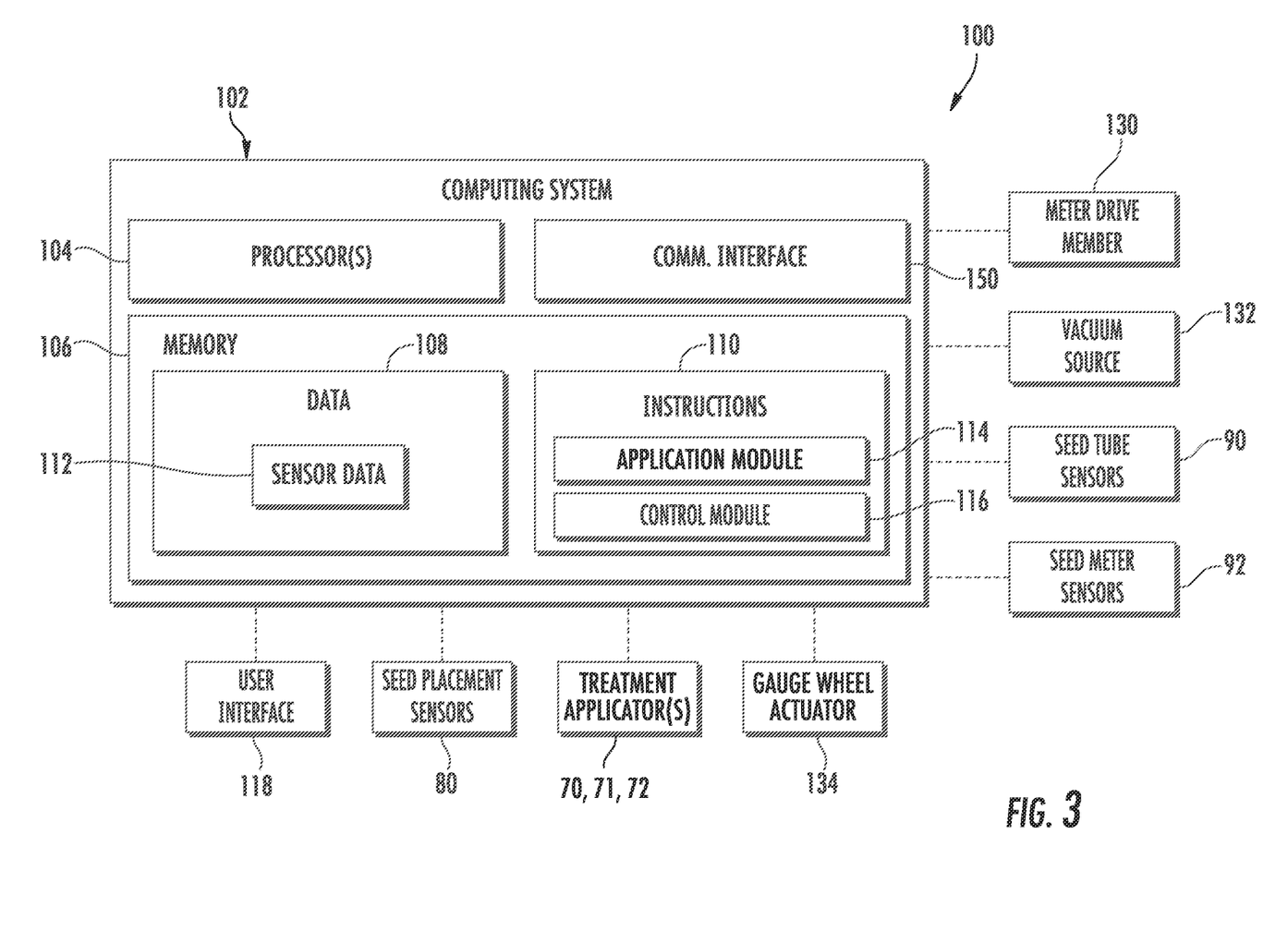
FIG. 3 illustrates a schematic view of one embodiment of a system for monitoring seed placement within the ground during the performance of a planting operation in accordance with aspects of the present subject matter.

Referring now to FIG. 3, a schematic view of one embodiment of a system 100 for monitoring seed placement within the ground during the performance of a planting operation is illustrated in accordance with aspects of the present subject matter. In general, the system 100 will be described herein with reference to the planting implement 10, the row unit 18, and related components described above with reference to FIGS. 1 and 2. However, it should be appreciated that the disclosed system 100 may generally be utilized with any planter or seeder having any suitable implement configuration and/or with row units having any suitable row unit configuration.

In several embodiments, the system 100 may include a computing system 102 and various other components configured to be communicatively coupled to and/or controlled by the computing system 102, such as the treatment applicator(s) 70, 71, 72, a meter drive member 130 configured to rotationally drive the seed meter 50, a vacuum source 132 configured to apply a vacuum or negative pressure to the seed disk or seed transport member of the seed meter 50, a gauge wheel actuator 134 configured to actuate gauge wheel of the row unit 18 to adjust the current planting depth, and/or various sensors configured to monitor one or more operating parameters associated with each row unit 18. For example, the computing system 102 may be communicatively coupled to one or more seed placement sensors 80 (e.g., one sensor per row unit) configured to generate data indicative of the placement of the deposited seeds within the soil, such as one or more ground penetrating radars configured to detect seeds located underneath the soil surface. In addition, the computing system 102 may be communicatively coupled to one or more additional sensors configured to generate data indicative of the frequency of the seeds being deposited within the furrow by each row unit, such as a seed tube sensor 90 and/or a seed meter sensor 92 provided in association with each row unit 18.

It should be appreciated that the computing system 102 may correspond to any suitable processor-based device(s), such as a computing device or any combination of computing devices. Thus, as shown in FIG. 3, the computing system 102 may generally include one or more processor(s) 104 and associated memory devices 106 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory 106 may include a sensor database 112 for storing sensor data and/or other relevant data that may be used by the computing system 102 in accordance with aspects of the present subject matter. For instance, during operation of the planting implement, data from all or a portion of the sensors communicatively coupled to the computing system 102 may be stored (e.g., temporarily) within the sensor database 112 and subsequently used to determine one or more parameter values associated with the operation of the planting implement, including any or all data generated by the seed placement sensor 80.

Moreover, in several embodiments, the instructions 110 stored within the memory 106 of the computing system 102 may be executed by the processor(s) 104 to implement an application module 114. In general, the application module 114 may be configured to activate/deactivate the treatment applicator(s) 70, 71, 72 to apply the treatment to the seeds 41. For instance, the computing system 102 may be configured to activate the treatment applicator(s) 70 to apply the dielectric treatment to the seeds within the tank(s) 20. Similarly, the computing system 102 may be configured to activate the treatment applicator(s) 71 to apply the dielectric treatment to the seeds 41 within the delivery lines 21, and/or the treatment applicator(s) 72 to apply the dielectric treatment to the seeds 41 while the seeds 41 are being dispensed from the row units 18 or after the seeds 41 are placed in the furrow(s) 29. The computing system 102 may control the treatment applicator(s) 70, 71, 72 such that essentially every seed 41 is treated, or may control the treatment applicator(s) 70, 71, 72 such that only some seeds 41 are treated (such as after an end of row turn and/or the like).

It should be appreciated that, in some embodiments, the seeds 41 may be both coated and treated. For example, in some instances, the seeds 41 may be coated before being received by the planting implement 10, but, at least in some areas of the field, the seed placement sensor 80 may still not able to detect the coated seeds 41 even though the effective dielectric property(ies) of the seeds 41 is improved. For instance, the field may be wetter and/or have a higher clay content than expected when selecting the coating material. As such, it may be beneficial to treat the coated seeds 41 to further improve the effective dielectric property(ies) of the seeds 41. In such instance, the computing system 102 may control the treatment applicator(s) 70, 71, 72 such that essentially every coated seed 41 is treated, or may control the treatment applicator(s) 70, 71, 72 such that only some coated seeds 41 are treated (such as after an end of row turn and/or the like). In some instances, the treatment on the coated seeds 41 will further increase one or both of the effective dielectric permittivity and the effective conductivity of the coated seeds 41. However, it should be appreciated that, in other instances, the treatment on the coated seeds 41 could decrease one or both of the effective dielectric permittivity and the effective conductivity of the coated seeds 41.

Referring still to FIG. 3, in several embodiments the instructions 110 stored within the memory 106 of the computing system 102 may also be executed by the processor(s) 104 to implement a control module 116. In general, the control module 116 may be configured to initiate a control action based on the seed placement parameter(s) determined using the data generated by the seed placement sensor(s) 80. For instance, in one embodiment, the control module 116 may be configured to provide a notification to the operator indicating the determined seed placement parameter(s), such as the current seed depth or seed spacing. For instance, in one embodiment, the control module 116 may cause a visual or audible notification or indicator to be presented to the operator via an associated user interface 118 provided within the cab of the vehicle used to tow the planting implement 10. For example, when the current seed depth is greater than a predetermined seed depth threshold (or outside of a predetermined seed depth range) and/or the current seed spacing is greater than a predetermined seed spacing threshold (or outside of a predetermined seed spacing range), the control module 116 may cause a visual or audible notification or indicator to be presented to the operator via the associated user interface 118 of the parameter being greater than the respective threshold (or out of the respective range).

In other embodiments, the control module 116 may be configured to execute an automated control action designed to adjust the operation of the row unit 18 or the planting implement 10. For instance, in one embodiment, the computing system 102 may be configured to automatically adjust the depth of the furrow being cut into the soil (e.g., by adjusting the relative position of the gauge wheel and opening assembly 26 via control of the gauge wheel actuator 134) based on placement data associated with the current depth at which the seeds are being planted. Similarly, in one embodiment, the computing system 102 may be configured to automatically adjust the operation of the seed meter 50 to vary the rate at which seeds are being deposited within the soil based on placement data associated with the current seed spacing and/or seed population. For instance, the computing system 102 may be configured to increase or decrease the speed at which the seed disc of the seed meter 50 is being rotated (e.g., via control of the meter drive member 130) if it is determined that the seed spacing needs to be adjusted relative to a target seed spacing range. Similarly, the computing system 102 may be configured to increase or decrease the vacuum pressure applied to the seed meter 50 (e.g., via control of the vacuum source 132) if it is determined that the current seed population is too low or too high relative to a target seed population range. As another example, the detection of missing seeds may be indicative of plugging or issues with the closing system. In such instances, the computing system may be configured to automatically adjust the operation of the row unit 18 and/or the planting implement 10 to address issues related to plugging/closing.

Moreover, as shown in FIG. 3, the computing system 102 may also include a communications interface 150 to provide a means for the computing system 102 to communicate with any of the various other system components described herein. For instance, one or more communicative links or interfaces (e.g., one or more data buses) may be provided between the communications interface 150 and the meter drive member 130, the vacuum source 132, and the gauge wheel actuator 134 to allow the computing system 102 to transmit control signals for controlling the operation of such components. Similarly, one or more communicative links or interfaces (e.g., one or more data buses) may be provided between the communications interface 150 and the various sensors 80, 90, 92, 140 to allow the associated sensor data to be transmitted to the computing system 102.

It should be appreciated that, in general, the computing system 102 may include suitable computing device(s) that is configured to function as described herein. In several embodiments, the computing system 102 may form part of an active planting system configured to perform a planting operation, such as by including a vehicle controller of a work vehicle configured to tow an associated planting implement 10 and/or an associated implement controller of the planting implement 10.

Figure 4:
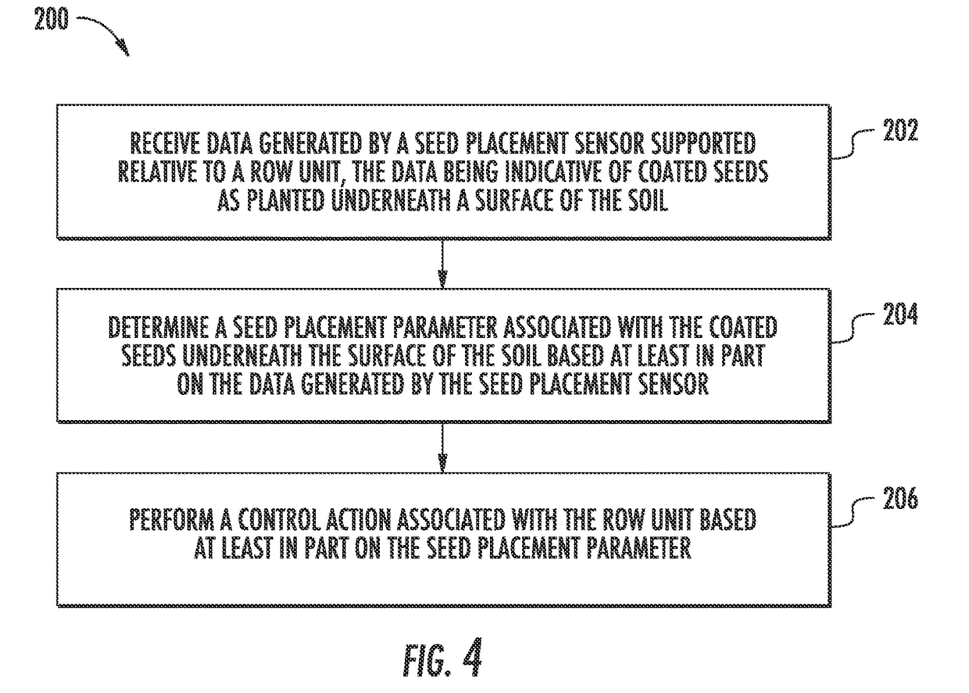
FIG. 4 illustrates a flow diagram of one embodiment of a method for monitoring seed placement within the ground during the performance of a planting operation in accordance with aspects of the present subject matter.

Referring now to FIG. 4, a flow diagram of one embodiment of a method 200 for monitoring seed placement within the ground during the performance of a planting operation is illustrated in accordance with aspects of the present subject matter. In general, the method 200 will be described herein with reference to the planting implement 10, row unit 18, and system 100 described above with reference to FIGS. 1-3. However, it should be appreciated by those of ordinary skill in the art that the disclosed method 200 may generally be utilized to monitor seed placement in associated with any planting implement having any suitable implement configuration, any row unit having any suitable row unit configuration, and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving data generated by a seed placement sensor supported relative to a row unit, the data being indicative of coated seeds as planted underneath a surface of the soil. As described above, the seeds may be coated with a coating having a dielectric property that is greater than a dielectric property of the seeds without the coating, such as a coating having a permittivity that is greater than the permittivity of the seeds without the coating and/or having an electrical conductivity that is greater than an electrical conductivity of the seeds without the coating. For instance, the seeds 41 may be pre-coated with a coating before being received in the seed tanks 20, where the coating has a permittivity that is greater than a permittivity of the seeds without the coating and/or a conductivity that is greater than a conductivity of the seeds without the coating. In such instance, the seed placement sensor 80 may generate data indicative of the coated seeds 41 as planted underneath a surface of the soil, where the data clearly indicates the coated seeds 41 underneath the surface of the soil compared to the surrounding soil.

Further, at (204), the method 200 may include determining a seed placement parameter associated with the coated seeds underneath the surface of the soil based at least in part on the data generated by the seed placement sensor. For example, as discussed above, the computing system 102 may determine the seed placement parameter (e.g., individual seed depth/position, relative seed spacing, seed population, missing seeds, etc.) associated with the coated seeds 41 underneath the surface of the soil based at least in part on the data 112 generated by the seed placement sensor 80.

Additionally, at (206), the method 200 may include performing a control action associated with the row unit based at least in part on the seed placement parameter. For instance, as discussed above, the computing system 102 may perform a control action associated with the row unit 18 based at least in part on the seed placement parameter, such as controlling an operation of the user interface 118, the meter drive member 130, the vacuum source 132, and/or the gauge wheel actuator 134.

Figure 5:
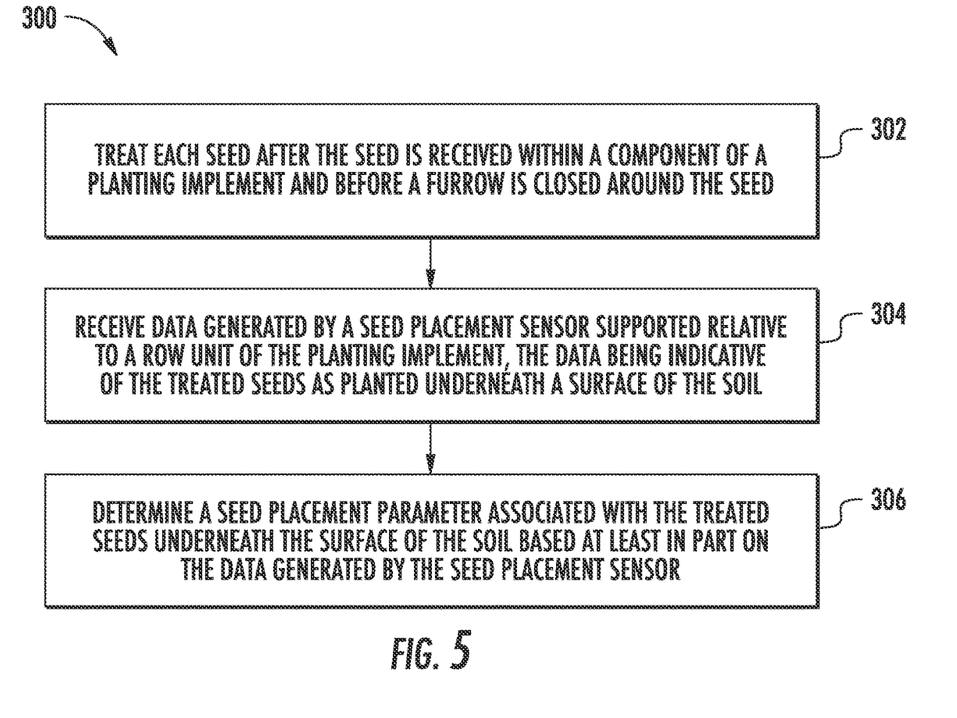
FIG. 5 illustrates a flow diagram of another embodiment of a method for monitoring seed placement within the ground during the performance of a planting operation in accordance with aspects of the present subject matter.

Referring now to FIG. 5, a flow diagram of one embodiment of a method 300 for monitoring seed placement within the ground during the performance of a planting operation is illustrated in accordance with aspects of the present subject matter. In general, the method 300 will be described herein with reference to the planting implement 10, row unit 18, and system 100 described above with reference to FIGS. 1-3. However, it should be appreciated by those of ordinary skill in the art that the disclosed method 300 may generally be utilized to monitor seed placement in associated with any planting implement having any suitable implement configuration, any row unit having any suitable row unit configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include treating each seed after the seed is received within a component of the planting implement and before the furrow is closed around the seed. As described above, the seeds may be treated with a treatment having a dielectric property that is greater than a dielectric property of the seeds without the treatment, such as a treatment having a permittivity that is greater than the permittivity of the seeds without the treatment and/or having an electrical conductivity that is greater than an electrical conductivity of the seeds without the treatment. For instance, the seeds 41 may be treated with a treatment after being received within a component of the planting implement 10, but before the furrow 29 is closed around the seeds 41, where the treatment has a permittivity that is greater than a permittivity of the seeds without the treatment and/or a conductivity that is greater than a conductivity of the seeds without the treatment. In such instance, the seed placement sensor 80 may generate data indicative of the treated seeds 41 as planted underneath a surface of the soil, where the data clearly indicates the treated seeds 41 underneath the surface of the soil compared to the surrounding soil.

The method 300, at (304), may further include receiving data generated by a seed placement sensor supported relative to a row unit of the planting implement, the data being indicative of the treated seeds as planted underneath a surface of the soil. For instance, as described above, the seed placement sensor 80 may generate data indicative of the treated seeds as planted underneath a surface of the soil, where the data clearly indicates the treated seeds underneath the surface of the soil compared to the surrounding soil.

Additionally, at (306), the method 300 may include determining a seed placement parameter associated with the treated seeds underneath the surface of the soil based at least in part on the data generated by the seed placement sensor. For example, as discussed above, the computing system 102 may determine the seed placement parameter (e.g., individual seed depth/position, relative seed spacing, seed population, missing seeds, etc.) associated with the treated seeds 41 underneath the surface of the soil based at least in part on the data 112 generated by the seed placement sensor 80.

The method 200 may also include performing a control action associated with the row unit based at least in part on the seed placement parameter. For instance, as discussed above, the computing system 102 may perform a control action associated with the row unit 18 based at least in part on the seed placement parameter, such as controlling an operation of the user interface 118, the meter drive member 130, the vacuum source 132, and/or the gauge wheel actuator 134.

It is to be understood that the steps of the methods 200, 300 are performed by the computing system 100 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 100 described herein, such as the methods 200, 300, is implemented in software code or instructions which are tangibly stored on a tangible computer readable medium. The computing system 100 loads the software code or instructions via a direct interface with the computer readable medium or via a wired and/or wireless network. Upon loading and executing such software code or instructions by the computing system 100, the computing system 100 may perform any of the functionality of the computing system 100 described herein, including any steps of the methods 200, 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring seed placement within the ground during the performance of a planting operation, the system comprising:
　　a row unit configured to deposit seeds within soil, the row unit including a furrow opening assembly configured to create a furrow in the soil for depositing seeds and a furrow closing assembly configured to close the furrow after the seeds have been deposited therein, the seeds being coated seeds that are coated with a coating having a coating dielectric property that is greater than a dielectric property of the seeds without the coating;
　　a seed placement sensor supported relative to the row unit and being configured to generate data indicative of the coated seeds as planted underneath a surface of the soil post-closing of the furrow; and
　　a computing system communicatively coupled to the seed placement sensor, the computing system being configured to:
　　　　receive the data generated by the seed placement sensor; and
　　　　determine a seed placement parameter associated with the coated seeds underneath the surface of the soil post-closing of the furrow based at least in part on the data generated by the seed placement sensor.

2. The system of claim 1, wherein the coating dielectric property comprises a coating permittivity that is greater than a permittivity of the seeds without the coating.

3. The system of claim 2, wherein the coating permittivity is at least 50% greater than the permittivity of the seeds without the coating.

4. The system of claim 1, wherein the coating dielectric property comprises a coating conductivity that is greater than a conductivity of the seeds without the coating.

5. The system of claim 1, wherein the coating comprises at least one of magnetite or graphite.

6. The system of claim 1, wherein the seed placement sensor comprises a ground-penetrating radar.

7. The system of claim 1, wherein the seed placement sensor is located aft of a closing assembly of the row unit relative to a direction of travel of the row unit.

8. The system of claim 1, wherein the seed placement parameter comprises at least one of a seed depth of each of the coated seeds or a spacing between the coated seeds.

9. The system of claim 1, wherein the computing system is further configured to control an operation of the row unit based at least in part on the seed placement parameter.

10. The system of claim 1, wherein the computing system is further configured to control an operation of a user interface associated with the row unit to indicate that the seed placement parameter is outside of a predetermined threshold.

11. A method for monitoring seed placement within the ground during the performance of a planting operation by a row unit configured to deposit seeds within soil, the row unit including a furrow opening assembly configured to create a furrow in the soil for depositing seeds and a furrow closing assembly configured to close the furrow after the seeds have been deposited therein, the method comprising:

receiving, with a computing device, data generated by a seed placement sensor supported relative to the row unit, the data being indicative of the seeds as planted underneath a surface of the soil post-closing of the furrow, the seeds being coated seeds that are coated with a coating having a coating dielectric property that is greater than a dielectric property of the seeds without the coating;

determining, with the computing device, a seed placement parameter associated with the coated seeds underneath the surface of the soil post-closing of the furrow based at least in part on the data generated by the seed placement sensor; and performing, with the computing device, a control action associated with the row unit based at least in part on the seed placement parameter.

12. The method of claim 11, wherein performing the control action comprises controlling an operation of a user interface associated with the row unit to indicate that the seed placement parameter is outside of a predetermined threshold.

13. The method of claim 11, wherein performing the control action comprises controlling an operation of the row unit to adjust the seed placement parameter.

14. The method of claim 11, wherein the coating dielectric property comprising a coating permittivity that is greater than a permittivity of the seeds without the coating.

15. The method of claim 14, wherein the coating permittivity is at least 50% greater than the permittivity of the seeds without the coating.

16. The method of claim 11, wherein the coating dielectric property comprises a coating conductivity that is greater than a conductivity of the seeds without the coating.

17. The method of claim 11, wherein the coating comprises at least one of magnetite or graphite.

18. The method of claim 11, wherein the seed placement sensor comprises a ground-penetrating radar.

19. The method of claim 11, wherein the seed placement parameter comprises at least one of a seed depth of each of the coated seeds or a spacing between the coated seeds.

* * * * *